United States Patent [19]

Simon

[11] Patent Number: 5,346,569
[45] Date of Patent: Sep. 13, 1994

[54] PROCESS FOR DEAIRING AN INTERFACE REGION

[75] Inventor: Robert H. M. Simon, Longmeadow, Mass.

[73] Assignee: Monsanto Company, St. Louis, Mo.

[21] Appl. No.: 61,957

[22] Filed: May 17, 1993

[51] Int. Cl.$^5$ .................... B32B 17/00; B32B 31/00
[52] U.S. Cl. ..................... 156/87; 156/102; 156/104; 156/286
[58] Field of Search ............ 156/87, 102, 104, 286, 156/276, 292; 428/156, 204

[56] References Cited

U.S. PATENT DOCUMENTS

| | | |
|---|---|---|
| 2,739,080 | 3/1956 | Woodworth . |
| 3,554,835 | 1/1971 | Morgan . |
| 3,591,406 | 7/1971 | Moynihan . |
| 3,881,043 | 4/1975 | Rieser et al. . |
| 4,452,840 | 6/1984 | Sato et al. . |

FOREIGN PATENT DOCUMENTS

| | | |
|---|---|---|
| 0014973 | 9/1980 | European Pat. Off. . |
| 1926643 | 12/1970 | Fed. Rep. of Germany . |
| 51-17209 | 2/1976 | Japan . |
| 1215318 | 12/1970 | United Kingdom . |
| 2040792 | 9/1980 | United Kingdom . |

OTHER PUBLICATIONS

English Translation of Kokai Patent SHO 60-28481, Feb. 13, 1985.
English Translation of German Patent DE 3731465, Mar. 1988.

*Primary Examiner*—Michael W. Ball
*Assistant Examiner*—Richard Crispino
*Attorney, Agent, or Firm*—Michael J. Murphy; Mark F. Wachter

[57] ABSTRACT

A process for deairing an interface region by applying on the surface of a plastic sheet a multitude of spaced plastic projections formed of a plastic material different from that of the sheet, assembling the sheet with the spaced projections in face to face contact with at least one rigid panel such as glass, and evacuating air from the interface region between the rigid panel and the plastic sheet through spaces between the projections.

10 Claims, 2 Drawing Sheets

PROCESS FOR DEAIRING AN INTERFACE REGION

BACKGROUND OF THE INVENTION

This is a continuation-in-part of commonly assigned, copending PCT application No. PCT/US90/07554 filed Dec. 20, 1990.

This invention relates to deairing an interface region and more particularly to preparing a deaired prelaminate for a safety glazing.

When preparing laminates of two or more layers it is desirable to remove air (hereinafter "deair") from the interface between layers before bonding together to promote bond integrity and avoid bond discontinuities. This is especially so with layered, light transmitting safety glazings for window, windshield, sunroof, skylight, intrusion security, showcase, picture frame and like applications. They include one or more rigid transparent panels such as glass combined in a laminate with an impact-dissipating plastic sheet such as plasticized polyvinyl butyral (PVB).

In the referenced application a plastic sheet is disclosed having means on its surface applied after its formation, preferably in the form of a multiplicity of spaced projections, which have little or no affinity for adhesion to glass or (after curing or equivalent) to the material of the sheet. Such projections control adhesion of the sheet to glass and reduce the tendency of the sheet to stick to itself when, for example, in roll form.

SUMMARY OF THE INVENTION

Now improvements have been made in deairing an interface region using sheet disclosed in the aforementioned copending application.

Accordingly, a principal object of this invention is to provide an improved method of deairing an interface region between layers of a prospective laminate.

Another object is to use sheet according to the aforementioned application for deairing the interface region between it and a rigid laminating panel.

A specific object is to use anti-adhesion projections on the surface of a plastic sheet to create, along with the planar surface of an abutting laminating panel, channels through which air may pass in deairing the interface region between the sheet and panel.

Yet an additional object is to provide methods achieving the foregoing objects.

Other objects of this invention will in part be obvious and will in part appear from the following description and claims.

These and other objects are accomplished by providing a process for deairing an interface region which comprises applying on the surface of a plastic sheet a multitude of spaced projections formed of a plastic material different from that of the sheet, assembling the sheet with the spaced projections in face to face contact with at least one, preferably two, rigid panel(s), and evacuating air from the interface region between the rigid panel(s) and the plastic sheet through spaces between the projections.

In a preferred embodiment, a process is provided for preparing a deaired prelaminate for a safety glazing which comprises: i) applying to each side of a transparent sheet of plasticized partial polyvinyl butyral, a multitude of spaced plastic projections which protrude about 0.1 to 0.75 mils (0.003 to 0.02 mm) from the surface of the sheet, the refractive indices of the projections being about the same as that of the sheet; ii) placing a glass panel in face to face contact with each side of the sheet so the sheet is supported between the panels through contact with the projections; and iii) heating the panels and supported sheet to at least about 50° C. while imposing a positive pressure or vacuum on the interface region between the panels and supported sheet to evacuate air from the interface through spaces between the projections and adhere the sheet to the panels to form the deaired prelaminate.

BRIEF DESCRIPTION OF THE DRAWINGS

In describing the overall invention, reference will be made to the accompanying drawings wherein.

DETAILED DESCRIPTION OF THE INVENTION

Figure 1:
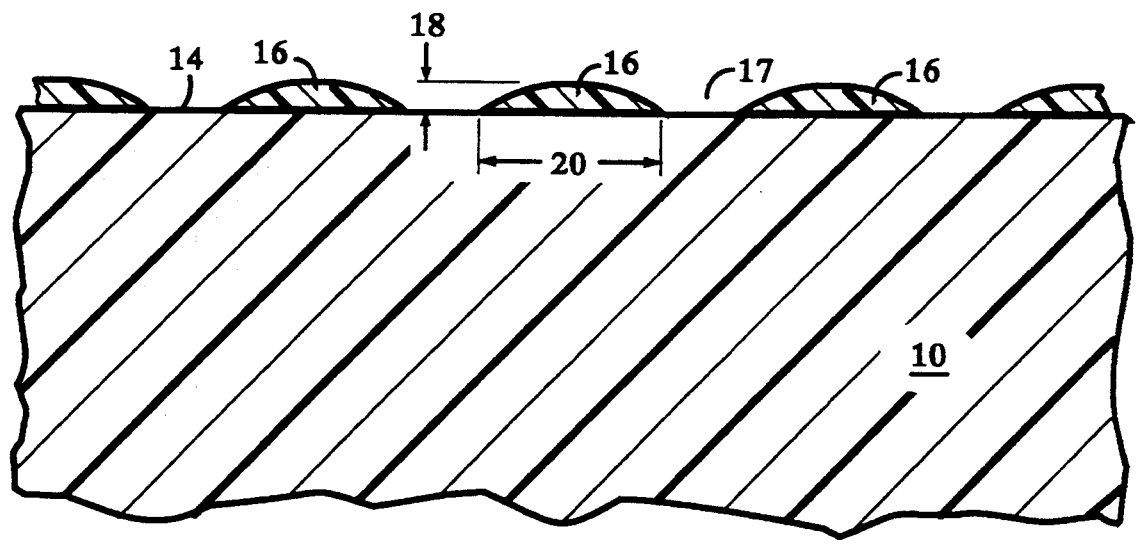
FIG. 1 is an enlarged, cross-sectional view of sheet usable in the process of the invention.

Referring to the drawings, plastic sheet 10 in FIG. 1, for use in layered laminated safety glazing 50 (FIG. 3) has on at least one, e.g. 14, and preferably on both of its opposite major side surfaces, a multitude of projections 16 capable in glazing 50 of little or no adhesion to a rigid panel, such as glass layer 52, 54. The surface area of the sheet between projections 16 typically has high affinity for adhesion to a rigid panel of the safety glazing. The impact strength of laminated safety glazing 50 is controlled by balancing the extent of surface contact with abutting rigid panel(s) 52, 54 of glazing 50 of i) the low or zero adhesion projections 16 and ii) the high adhesion affinity sheet surface adjacent or between projections. This is more completely described in the application referred to above. Pursuant to this invention, projections 16 serve a deairing function in a manner to be described.

To be functional the plastic of sheet 10 in safety glazing 50 must be optically clear (have less than about 4%, preferably less than 2% haze) and capable of bonding by heat and pressure to the rigid panel to form an impact-dissipating layer in glazing 50. Exemplary plastics include poly(ethylene-vinyl acetate), poly(ethylene-vinyl acetate-vinyl alcohol), poly(ethylene-methyl methacrylate-acrylic acid), polyurethane, plasticized polyvinyl chloride, etc. Plasticized polyvinyl butyral and more particularly partial polyvinyl butyral containing about 10 to 30 weight % hydroxyl groups expressed as polyvinyl alcohol is preferred. Such partial PVB is well known and further comprises about 0 to 2.5 weight % acetate expressed as polyvinyl acetate with the balance being butyral expressed as polyvinyl butyral. The thickness of plasticized partial PVB sheet 10 is about 0.25 to 1.5, preferably about 0.35 to 0.75 mm. It is commercially available from Monsanto Company as Saflex® sheet and E. I. duPont de Nemours and Co. as Butacite® polyvinyl butyral resin sheeting.

Partial PVB resin must be plasticized with about 20 to 80, preferably 25 to 45, parts of plasticizer per 100 parts of resin. Usable plasticizers are disclosed in U.S. Pat. No. 4,654,179, col. 5, lines 56-65, the content of which is incorporated herein, by reference. Dihexyl adipate is preferred.

Though transparent glass is preferred, the rigid panel of the laminated safety glazing may alternatively be transparent plastic such as polycarbonate, poly(methyl methacrylate), poly(ethylene terephthalate) and the like.

Projections 16 are vertically shallow and spaced from each other in a discontinuous, dispersed manner on surface 14 of sheet 10 forming gaps 17 between projections. Though not essential, projections 16 preferably form an ordered pattern on sheet surface 14.

The extent of coverage of sheet surface 14 with projections 16 can vary. Projections 16 usually cover about 10 to about 60%, preferably 20 to 45% of surface area 14 of the sheet side from which they project. With plasticized partial PVB sheet at less than about 10% coverage, no appreciable assist in deairing will occur using glass, whereas at more than about 60% the adhesion function is excessively decreased. In terms of number, projections 16 are typically present at a frequency of about 38 to 3800 projections per square cm of major sheet surface 14. Depending on size, individual projections typically extend (dimension 18 in FIG. 1) about 0.1 to 0.75 mils (0.003 to 0.02 mm) preferably at least about 0.5 mils (0.013 mm) from surface 14. Projections 16 need not be individually precisely dimensioned and can be of arbitrary shape such as conical, elliptical, oblong, oval, rectangular, square or other similar shape. Projections 16 are minute and akin to dots, diameter 20 (FIG. 1) and height 18 of the preferred circular cross-sectional shape for a representative coverage of about 22% of surface area 14 being typically respectfully about 0.2 mm and 0.013 mm with about 650 such projections per square cm of sheet surface.

The material of projections 16 can vary as long as it has weak or no adhesion to the surface of the rigid panel of the safety glazing yet does adhere to the surface of the sheet at a level adequate to resist accidental removal during handling before lamination. A peel strength at the interface with sheet 10 of at least about 2N/cm is generally adequate to achieve this. In the illustrated embodiment, projections 16 are formed of plastic material which is different from that of sheet 10. Representative such plastics include melamines, uncrosslinked polyurethane, polyvinyl formal, polyvinyl chloride, poly(methyl methacrylate), polycarbonate and crosslinked plastics such as crosslinked polyvinyl butyral, epoxies and the like. When sheet 10 is of plasticized partial PVB, a particularly preferred plastic for projections 16 is polyacrylate, to be further described. Projections 16 are preferably of the same color as sheet 10, e.g. clear and colorless and substantially visually imperceptible in finished laminated safety glazing 50. In other words, projections 16 though present in the finished laminate are preferably not visually apparent yet importantly serve deairing and adhesion control functions. To achieve this the refractive index of the plastic material of the projections, and specifically of the preferred polyacrylate form of projection, preferably substantially matches that of the plastic of sheet 10, and specifically that of the preferred plasticized partial PVB of sheet 10. In this regard, the refractive index of projections 16 is within ±0.0005, preferably ±0.0003 refractive index units of the refractive index of sheet 10.

Layered laminated safety glazing 50 is typically formed at elevated conditions of temperature and pressure (about 140° C., 1135 kPa for 30 min) known to those skilled in the art to strongly bond surfaces of rigid (e.g. glass) layers 52, 54 to the regions of sheet 10 of FIG. 1 intermediate dispersed projections 16. When projections 16 are of crosslinked polyurethane or polyacrylate on PVB sheet, during laminating they are typically pressed into the sheet in the thickness direction and assume the inverted compressed position shown as 56 in FIG. 3, vis-a-vis the different initial unstressed condition of FIG. 1. When of a different material or using different laminating conditions, such projections in glazing 50 may assume a different configuration from that shown which is not of particular concern as long as the adhesion-resisting function is present. During laminating bonding to form the structure of FIG. 3, the partial PVB of the sheet 10 melts at the elevated temperature encountered and flows around projections 56 to fill any voids and provide the void-free interface shown. The plastic of compressed projections 56 has no or weak interfacial adhesion to the surfaces of glass layers 52, 54 and mechanically physically blocks the underlying covered area of sheet 10 from which the projections protrude from adhering to the glass, to control the adhesion of sheet 10 to glass panels 52, 54 by the number and size of projections 16 present. In other words, the major regions of sheet 10 between projections 16 conventionally adhere in the areas shown as 58 in FIG. 3 to the surface of the glass panels through interaction of the partial PVB resin with the glass surface. This macroscopic interference with adhesion differs from that occurring on an atomic or molecular scale using chemical adhesion control additives. The bonding force (if any) at the contact surface between glass and protrusions 56 is always less than the bonding force between the glass and gaps 58 between and without protrusions 56.

Projections 16 are applied to surface 14 of sheet 10 by any known printing technique such as letterpress, gravure, rotogravure, dot and/or jet printer, spraying or the like.

Surface 14 of sheet 10 need not be covered throughout with an identical pattern of projections 16. For example, it may be desirable to provide local zones of high adhesion for specific applications by purposely altering the pattern to leave more uncoated sheet surface between projections during the deposition operation. Moreover, when applied to both sides, the projections pattern may be the same or different. A random uneven pattern is likewise usable. Projection configuration, projection pattern on the sheet surface and sheet surface coverage are conveniently typically set by a corresponding pattern on a gravure plate used to deposit the projections on the sheet.

Figure 2:
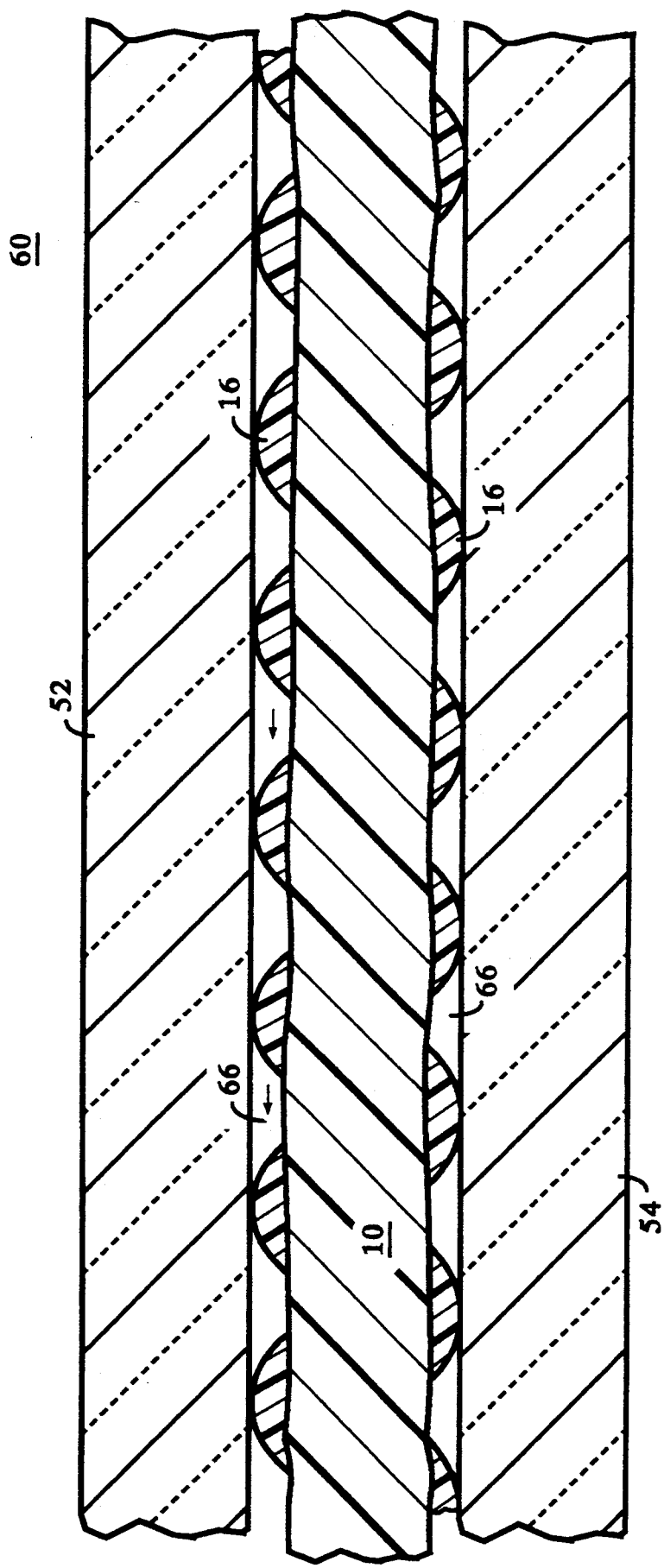
FIG. 2 is a cross-sectional view showing the interface region of the sheet of FIG. 1 with glass during deairing.

Deairing is illustrated in FIG. 2. As known in the art, before carrying out the previously described elevated temperature and pressure laminating step forming safety glazing 50, air must be removed from the interface region between the plastic sheet and rigid panel to avoid optical deficiencies in the laminated glazing in the form of discontinuities in adhesion between layers, air pockets and the like. Toward this end, the invention provides a process for preparing deaired prelaminate 60 (FIG. 2) for safety glazing 50 (FIG. 3) using plastic sheet 10 of FIG. 1 on at least one, and preferably both major sides of which have been applied the previously described multitude of projections 16. Glass panel 52, 54 is placed in face to face contact with each side of sheet 10 so the sheet is supported between panels 52, 54 through surface contact with projections 16 as in FIG.

Figure 3:
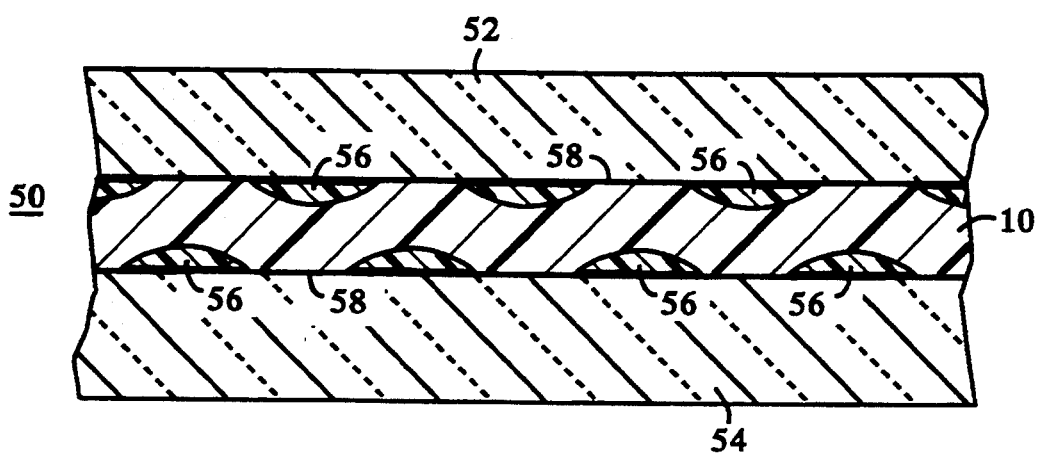
FIG. 3 is a cross-sectional view similar to FIG. 2 showing the interfaces of the sheet of FIG. 2 with glass after laminating

2. The previous open-topped spaces 17 in FIG. 1 between projections 16 are now covered by surface portions of panels 52, 54 to form a multitude of channels or paths 66 open along the sides to the exterior of the prelaminate. Using an external means not shown but about to be described, residual air is evacuated through channels 66. During, before or after such evacuation the plastic sheet and projections are heated to a temperature (at least about 50° C.) adequate to cause some viscous flow of the plastic of sheet 10. Depending on temperature reached, some projections 16, usually inward of the peripheral border, may invert during deairing and assume the position illustrated at 56 (FIG. 3). This can be controlled so as not to occur until the residual air has been substantially completely removed from the interfacial regions between the layers.

The external means for evacuating air are known. A positive pressure or vacuum imposed on the interface region evacuates the air and, in conjunction with the noted heating, adheres the plastic to the rigid panel(s) to form the deaired prelaminate. Positive pressure is developed using a pair of cooperating nip rolls, not shown, having resilient surfaces vertically spaced to define a nip through which the assembly of panel(s) and sheet are passed. The nip opening is set so the assembly is compressed in passing through it thereby forcing air out the edges of the assembly. When rigid panels 52, 54 are contoured (i.e. not flat) the nip rolls are likewise contoured to match the panels.

When vacuum is used to evacuate air, the assembly of rigid panel(s) and sheet is typically placed in an impervious rubber bag in communication with a vacuum source. The vacuum evacuates the interface region and draws the rubber bag against the panels to force them together and lightly bond them to the interposed plastic sheet. Instead of a bag, a vacuum ring can be used which is peripherally placed around and sealed to the rigid panels at the interface region. The sealed ring communicates with a source of vacuum and the interface region to evacuate the air.

The invention is further described in the following example which is for illustration only and not to limit or restrict the invention.

EXAMPLE

The Sheet

A plastic sheet 0.76 mm thick of partial PVB resin is plasticized with about 32 parts dihexyl adipate per 100 parts resin. The sheet has on each side a rough surface integrally formed during sheet formation of the material of the sheet rendering it opaque to the transmission of light. Using a profilometer, the roughness is measured as 33–35 microns. This roughness is optional and may be dispensed with or not purposely developed, instead relying only on projections 16 for deairing.

Projections Formulation

Acrylated aliphatic urethane oligomers are commercially available from Radcure Specialties, Norfolk, Va. 23513 as Ebecryl 230 and Ebecryl RSX 89462. The following liquid formulation (viscosity of 3.75 Pa.s at 24° C.) is prepared (percentages by wt.).

| | |
|---|---|
| Ebecryl RSX 89462 | 44% |
| Ebecryl 230 | 32% |
| Sartomer 9003[1] | 21% |
| Photoinitiator[2] | 3% |

[1]Propoxylated neopentyl glycol diacrylate
[2]Darocur - 1173 from Ciba Geigy identified as 2-hydroxy-2-methyl-1-phenylpropan-1-one.

The above formulation is blended at 25° C. in a paddle mixer for about one hour.

Applying The Formulation To The Sheet

A gravure cylinder having depressions in its surface corresponding to the pattern of projections desired on the sheet is rotated into a reservoir containing the above formulation to fill the depressions with the formulation. The excess is wiped off with a doctor blade. The formulation is transferred from the cylinder to the sheet in a nip formed by the cylinder and a cooperating rubber-faced backup roll. The nip opening is set so the rolls slightly pinch the thickness of the sheet applying just enough roll pressure to transfer the formulation to the sheet surface as a multiplicity of spaced projections affixed on the sheet in the same pattern as the depressions in the gravure cylinder. The projections are circular as shown in FIG. 2 with the approximate base diameter and height being respectively 10 and 0.5 mils (0.25 and 0.01 mm). The sheet containing the projections formed of the unreacted acrylate formulation is then exposed to 800 mJ/cm$^2$ of UV radiation to cure the material of the projections and form the polyacrylate. Because the rough surface texture of the sheet is altered by the presence of the cured projections, they may be apparent to the naked eye before subsequent lamination with optically transparent glass. After such lamination, however, they are invisible, the refractive indices of the sheet and projections being essentially matched. The procedure described is repeated to coat and cure the opposite side of the sheet.

Preparing A Deaired Prelaminate 30.5 cm × 30.5 cm single ply samples of coated sheet prepared as noted above are disposed between two layers of clear float glass of the same dimensions to form 3-ply assemblies of glass/coated sheet/glass such as depicted in FIG. 2. Each assembly is placed in a flexible rubber bag in communication with a vacuum source. The bag and assembly are exposed to 55° C. for 15 min, then vacuum (500 mm mercury) is applied for 5 min followed by exposure to 120° C. for 15 min at said vacuum to remove air form the interface regions. The vacuum is disconnected and the bag containing a deaired prelaminate cooled to room temperature. The prelaminate containing the coated sheet press-bonded on each side to a glass layer is cut into four 15 cm × 15 cm samples and % light transmission (% T) through each prelaminate sample measured (as compared with an identical control C$_1$ except without coated projections) using a photometer from Tokyo Denshoku Co. Ltd. Values (average of the four samples) obtained are as follows:

| | % T |
|---|---|
| Example 1 | 73 |
| Example C$_1$ | 64 |

As a function of transmitted light (at least about 70%), the above values show that a prelaminate with sheet containing deairing projections deaired better than a control having a standard rough deairing surface but without spaced projections.

Subjecting the deaired prelaminate formed as noted above to bonding conditions in an autoclave for two hours (1275 kPa, 150° C.) firmly bonds the plastic sheet to the glass layers to form a finished safety glazing such as shown in FIG. 3.

The preceding description is for illustration and should not to be taken as limiting. Various modifications and alterations will be readily suggested to persons skilled in the art. It is intended, therefore, that the foregoing be considered as exemplary only and that the scope of the invention be ascertained from the following claims.

I claim:

1. A process for deairing an interface region which comprises:

applying on a surface of a plastic sheet of plasticized partial polyvinyl butyral a multitude of spaced projections numbering about 38 to 3800 per square centimeter of sheet surface which are formed of a plastic material different from that of the sheet, the refractive indices of the projections and the partial polyvinyl butyral being about the same;

assembling the sheet surface with the spaced projections in face to face contact with at least one rigid glass panel; and evacuating air from an interface region between the rigid panel and the plastic sheet through the spaces between the projections.

2. The process of claim 1 further comprising:

applying projections to the opposite surface of the sheet;

assembling a second rigid glass panel with said opposite surface to create a second interface region between the second rigid panel and opposite surface; and evacuating air from the second interface region through the spaces between the projections on the opposite surface simultaneously with evacuating air from the interface region referred to in claim 1.

3. The process of claim 2 wherein the projections extend at least about 0.5 mil (0.013 mm) away from the sheet surface.

4. The process of claim 3 wherein the plastic sheet and rigid glass panels are at a temperature of at least about 50° C. during evacuating of the air.

5. The process of claim 4 wherein the light transmission through the rigid panels and glass sheet after deairing is at least about 70%.

6. A process for deairing an interface region between a plastic sheet and a glass panel which comprises evacuating air through spaces between a multitude of projections on a surface of the sheet on which the glass panel rests, said projections extending at least about 0.5 mils (0.013 mm) from the surface of the sheet and being formed of a plastic material which is different from the plastic of the sheet but has a refractive index about the same as that of the plastic of the sheet.

7. The process of claim 6 wherein the sheet is formed of plasticized partial polyvinyl butyral.

8. A process for preparing a deaired prelaminate for a safety glazing which comprises:

i) applying to each side of a sheet of plasticized partial polyvinyl butyral, a multitude of spaced plastic projections which protrude about 0.1 to 0.75 mils (0.003 to 0.02 mm) from the surface of the sheet, the refractive indices of the projections being about the same as that of the sheet, said projections being capable of little or no adhesion to glass;

ii) placing a glass panel in face to face contact with each side of the sheet so the sheet is supported between the panels through contact with the projections; and iii) heating the panels and supported sheet to at least about 50° C. while imposing a positive pressure or vacuum on the interface region between the panels and supported sheet to evacuate air from the interface through spaces between the projections and adhere the sheet to the panels to form the deaired prelaminate.

9. The process of claim 8 wherein during heating some of the projections evert so as to project in the opposite direction into the thickness of the sheet.

10. The process of claim 9 wherein before heating, the glass panels and the sheet supported on the projections between the panels are inserted into a rubber bag communicating with a vacuum source.

* * * * *